United States Patent [19]

Worwood et al.

[11] Patent Number: 4,498,495
[45] Date of Patent: Feb. 12, 1985

[54] MAGNETIC DIFFERENTIAL PRESSURE VALVE WITH AN INDICATOR SHOWING WHEN VALVE HAS OPENED OR CLOSED

[75] Inventors: Bryan H. Worwood; Paul Stallard, both of Clanfield, England

[73] Assignee: Pall Corporation, Glen Cove, N.Y.

[21] Appl. No.: 289,866

[22] Filed: Aug. 4, 1981

[51] Int. Cl.³ .............................................. F16K 37/00
[52] U.S. Cl. .................................. 137/557; 137/554; 137/559; 116/267; 210/90
[58] Field of Search .............. 137/553, 554, 557, 559; 210/90; 116/267

[56] References Cited

U.S. PATENT DOCUMENTS

| 2,942,572 | 6/1960 | Pall | 116/267 |
| 3,029,836 | 4/1962 | Gruner | 137/557 |
| 3,077,854 | 2/1963 | Pall | 116/267 |
| 3,140,690 | 7/1964 | Siebel | 116/267 |
| 3,420,266 | 1/1969 | Downey | 116/267 |
| 3,633,612 | 1/1972 | Gross | 116/267 |

Primary Examiner—A. Michael Chambers

[57] ABSTRACT

A magnetic differential pressure valve is provided, having an indicator showing when the valve has moved into one of the open and closed positions, comprising a housing including a valve seat; valve means reciprocably mounted in the housing for movement towards and away from the valve seat between open and closed positions; first magnetic means movable with the valve means toward and away from the valve seat; first bias means urging the valve means and first magnetic means in one direction and normally retaining the valve means and first magnetic means in one of the closed and open positions; second magnetic means movable toward and away from the first magnetic means and normally retained in a first nonindicating position, reacting with the first magnetic means whenever the two means are within their mutually reactive magnetic fields of force, and the valve means is in one of the closed and open positions; and second bias means urging the second magnetic means into one of the nonindicating and indicating positions when the first magnetic means has moved to a predetermined distance from the second magnetic means, the second magnetic means in its indicating position indicating that the valve means has either opened or closed fluid flow communication between the first and second fluid duct means.

15 Claims, 5 Drawing Figures

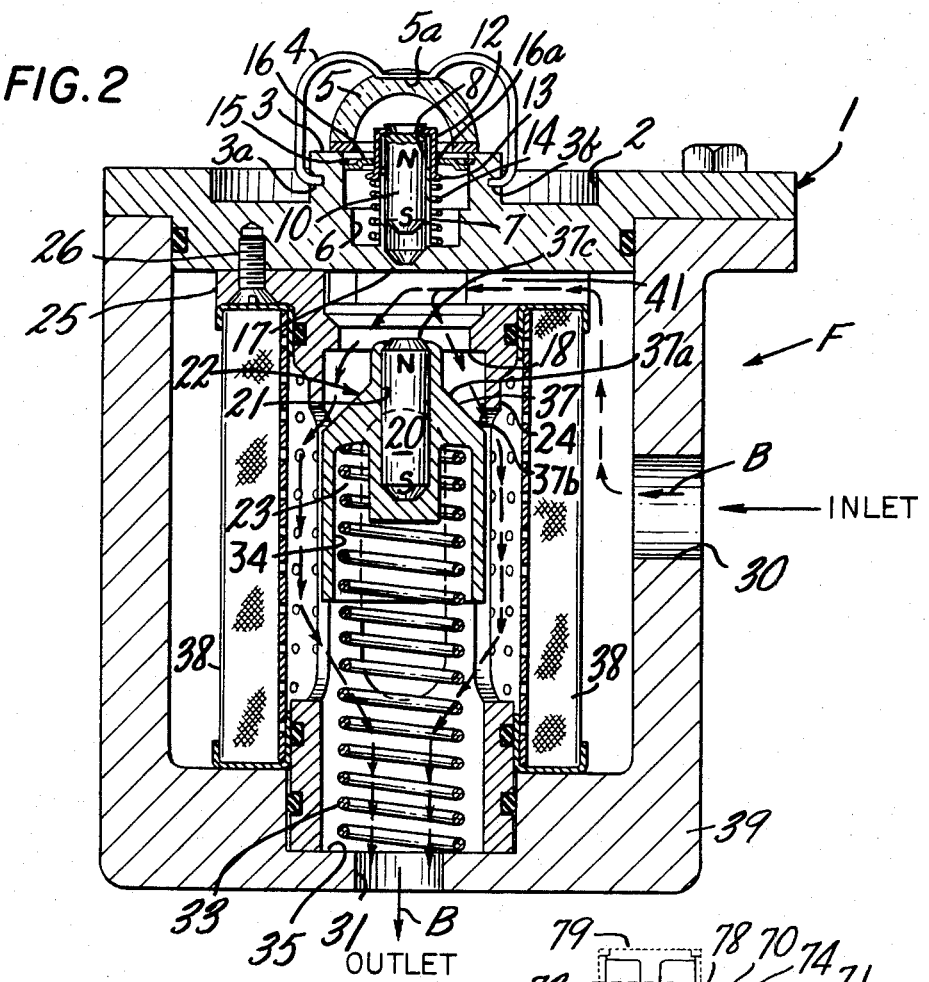
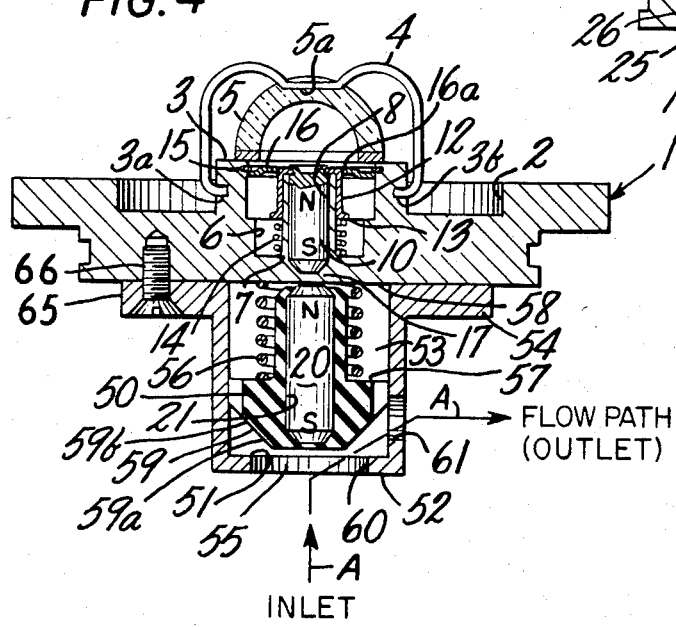
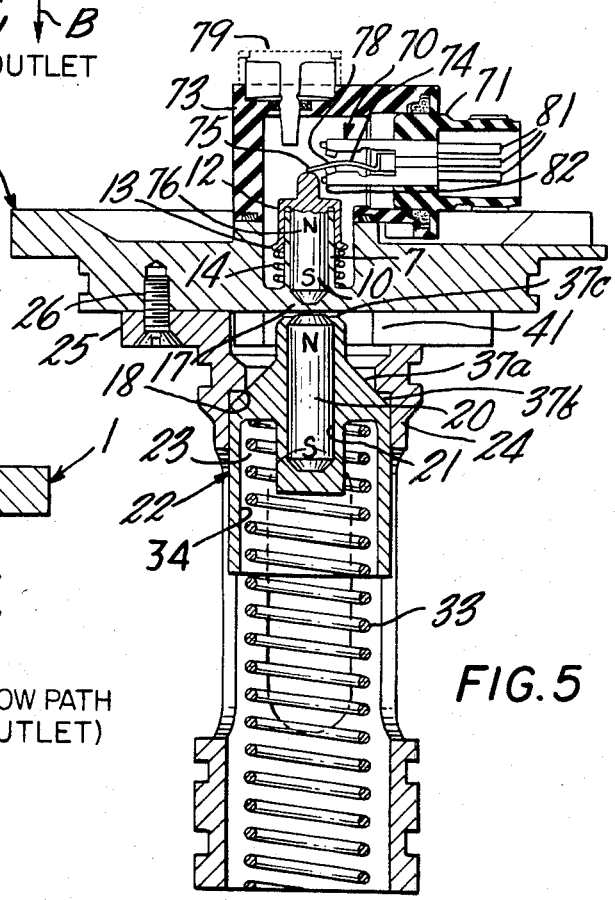

MAGNETIC DIFFERENTIAL PRESSURE VALVE WITH AN INDICATOR SHOWING WHEN VALVE HAS OPENED OR CLOSED

In fluid systems wherein a fluid such as oil or fuel is passed through a filter assembly, it is frequently desirable to provide a bypass line permitting bypass of the filter element, so as to prevent starvation of the fluid system downstream of the filter assembly whenever clogging of the filter element, such as by accumulation of sufficient contaminants filtered out of the fluid, impedes the flow of fluid unduly. Inasmuch as the pressure drop across the filter element increases due to the accumulation of contaminants on the surface of the filter element, a suitable indication of the clogged condition of the filter element can be obtained by utilizing a differential pressure device, set to be actuated when the pressure drop across the filter element reaches a predetermined value. Many types of such devices are available, in which the indicating means is actuated mechanically, or electrically, or by other means.

One simple and very successful type of indicating device is the magnetic pressure indicator of U.S. Pat. No. 2,942,572 to David B. Pall. In this device, a first magnetic means is arranged to attract a second magnetic means so long as the two means are separated by less than a predetermined distance. Bias means propels the second magnetic means to an indicating position whenever that distance is exceeded. The first magnetic means is movable with a piston responsive to changes in differential pressure, and is normally biased towards the second magnetic means by a predetermined force. The second magnetic means is also movable with a piston, and while retained toward the first means by magnetic attraction when close enough thereto, is normally biased in a direction away from the first means by a force capable of overcoming the force of magnetic attraction whenever the first and second means are separated by the predetermined distance. The magnitude of the spring biasing force acting upon the first magnetic means controls the predetermined pressure differential at which the device is actuated. Thus, the device can be arranged to be actuated at any required differential pressure, by simple adjustment of this force.

In the usual form of this device, the second magnetic means is arranged to project from the housing after actuation. In another form, the second magnetic means is arranged to give an electric signal upon actuation. In either case, the device can be reset merely by pushing the second magnetic means back toward the first magnetic means, into a position where the magnetic force once again overcomes the spring-biasing force. If the differential pressure across the filter element has meanwhile been reduced, due for instance to a reduction in the flow, the reset indicating means will thereupon remain in its normal position.

In accordance with the present invention, a magnetic differential pressure valve is provided, with an indicator showing when the valve has moved into one of the open and closed positions, comprising a housing including a valve seat; valve means reciprocably mounted in the housing for movement towards and away from the valve seat between open and closed positions; first magnetic means movable with the valve means toward and away from the valve seat; first bias means urging the valve means and first magnetic means in one direction and normally retaining the valve means and first magnetic means in one of the closed and open positions; first fluid duct means communicating with a source of fluid under pressure and with a pressure-receiving surface on the valve means to urge it and the first magnetic means in the opposite direction; second fluid duct means communicating with the first fluid duct means for fluid flow past the valve means only when the valve means has moved away from the valve seat into the open position; second magnetic means movable toward and away from the first magnetic means and normally retained in a first nonindicating position, reacting with the first magnetic means whenever the two means are within their mutually reactive magnetic fields of force; and the valve means is in one of the closed and open positions; and second bias means urging the second magnetic means into one of the nonindicating and indicating positions when the first magnetic means has moved to a predetermined distance from the second magnetic means, the second magnetic means in its indicating position indicating that the valve means has either opened or closed fluid flow communication between the first and second fluid duct means.

The term "magnetic" as used herein encompasses both materials that are permanent magnets and materials that are attracted by magnets, whether permanently or temporarily magnetizable thereby.

The device in accordance with the invention comprises a first magnetic means movable with the valve means and spaced from and arranged to attract or repel a second magnetic means or keeper so long as the two means or the first means and keeper are within their mutual magnetic fields of force, the second magnetic means normally being retained in a first position; first bias means to retain the valve means and first magnetic means towards or away from the second magnetic means or keeper; and second bias means to propel the second magnetic means from the first position to a valve-open or valve-closed indicating position whenever the spacing between the two magnetic means is changed.

The first magnetic means and valve means are movable with or are associated with a first piston, movable in response to changes in differential pressure towards or away from a valve seat, and are normally biased toward or away from the second magnetic means or keeper by a predetermined force. The second magnetic means is movable with or is a second piston.

In a first embodiment in which the second magnetic means is retained toward the first magnetic means or keeper by magnetic attraction, when close enough thereto, the second magnetic means is normally biased in a direction away from the first means or keeper by a force capable of overcoming the force of magnetic attraction to the first means or keeper whenever the first and second magnetic means or keeper are spaced by more than a predetermined distance.

In a second embodiment in which the second magnetic means is repelled away from the first magnetic means or keeper by magnetic repulsion, when close enough thereto, the second magnetic means is normally biased in a direction towards the first means or keeper by a force which is low enough to be overcome by the force of magnetic repulsion from the first means or keeper whenever the first and second magnetic means or keeper are spaced by less than a predetermined distance.

The valve means engages a valve seat in a leak-tight seal in the closed position, and in the first embodiment the second magnetic means or piston is retained in a nonindicating position while the means or piston is magnetically attracted to the first magnetic means or keeper. Whenever the valve means and first magnetic means move a sufficient distance away from the valve seat to open the valve and permit fluid flow therepast, in that position the biasing force moving the second magnetic means to an indicating position is capable of overcoming the magnetic attraction between the second magnetic means and the first magnetic means or keeper.

In the second embodiment, when the valve means engages the valve seat in a leak-tight seal in the closed position, the second magnetic means or piston is retained in a nonindicating position by the bias means, and is magnetically repulsed by the first magnetic means or keeper, which in the normal position is spaced away therefrom so as to be outside its magnetic field of force. Whenever the valve means and first magnetic means move a sufficient distance away from the valve seat to open the valve and permit fluid flow therepast, in that position the biasing force holding the second magnetic means in a nonindicating position is overcome by the force of magnetic repulsion between the second magnetic means and the first magnetic means or keeper, and the second magnetic means is propelled to an indicating position.

In like manner, the first magnetic means and valve means can be arranged to drive the second magnetic means into an indicating position whenever the valve means moves towards or enters the closed position, in a leak-tight seal with the valve seat.

The first and second magnetic means are each movable, and can be magnets or attracted to magnets. The keeper is stationary, and is positioned therebetween, spacing them by a predetermined distance at least equal to the spacing dimension of the keeper, and can be a magnet or attracted by magnets, so that one at least of the magnetic means is attracted to the keeper. The other can be attracted to the keeper or other magnetic means, or repelled by the keeper or the other magnetic means.

At least one of the two magnetic means and keeper is a magnet. Preferably, two of these elements (in any combination) are magnets, and if desired, all three can be magnets, but three are not always as advantageous as two. In addition, the keeper can be of nonmagnetic material.

If the keeper is a magnet and the first and second magnet means are merely attracted thereto, the device functions because the first magnet means when it moves away from or moves towards the keeper changes the magnetic field between the keeper and the second magnetic means.

The keeper normally serves as the separating wall between the first and second magnetic means, and prevents fluid communication between the spaces within which the first and second magnetic means move. The keeper can be a piece fitted between these spaces, or an integral part of the housing defining such spaces. If the spaces are bores, usually coaxial, the keeper can close off and separate the two parts of the bore from each other, and define a pair of blind bores within which the two magnetic means move.

The valve means and first magnetic means movable therewith can take any of several forms. They can, for example, be a part of and/or associated with a piston movable reciprocably towards and away from a valve seat, as illustrated in the drawings. The piston can be in the form of a cylinder, and the valve means a portion of the external side or end surface of the piston, or a flange thereon, with the valve seat a part of or associated with the wall or end of the cylindrical bore in which the piston moves. The valve means and first magnetic means can also take the form of a piston of high surface area, such as a flexible disc or diaphragm, with the valve means thereof movable reciprocably towards and away from a valve seat, and the first magnetic means movable reciprocably towards and away from the second magnetic means, as shown and described, for instance, in U.S. Pat. No. 3,077,176, dated Feb. 12, 1963, to David B. Pall et al.

The second magnetic means also can be in the form of a piston, or part of a piston. It can be arranged to project from the housing for the indicator, for a visual indication. It also can be arranged to actuate a switch, as in U.S. Pat. No. 3,077,854 to David B. Pall, dated Feb. 19, 1963, or to move an indicator, such as a pointer, or magnetic fibers, either directly or magnetically.

The biasing means for the first and second pistons can take the form of a spring, such as a coil spring, a finger spring, a wave-form spring, a conical spring, or an annular disc spring, such as a Belleville spring. The biasing means can also be a third magnet, as disclosed in U.S. Pat. No. 3,140,690, to M. P. L. Siebel, in which case a spring can optionally be included or omitted.

Preferred embodiments of the invention are shown in the drawings, in which:

FIG. 2 is another view in longitudinal section of the valve of FIG. 1, with the valve in the open, indicating position;

Figure 1:
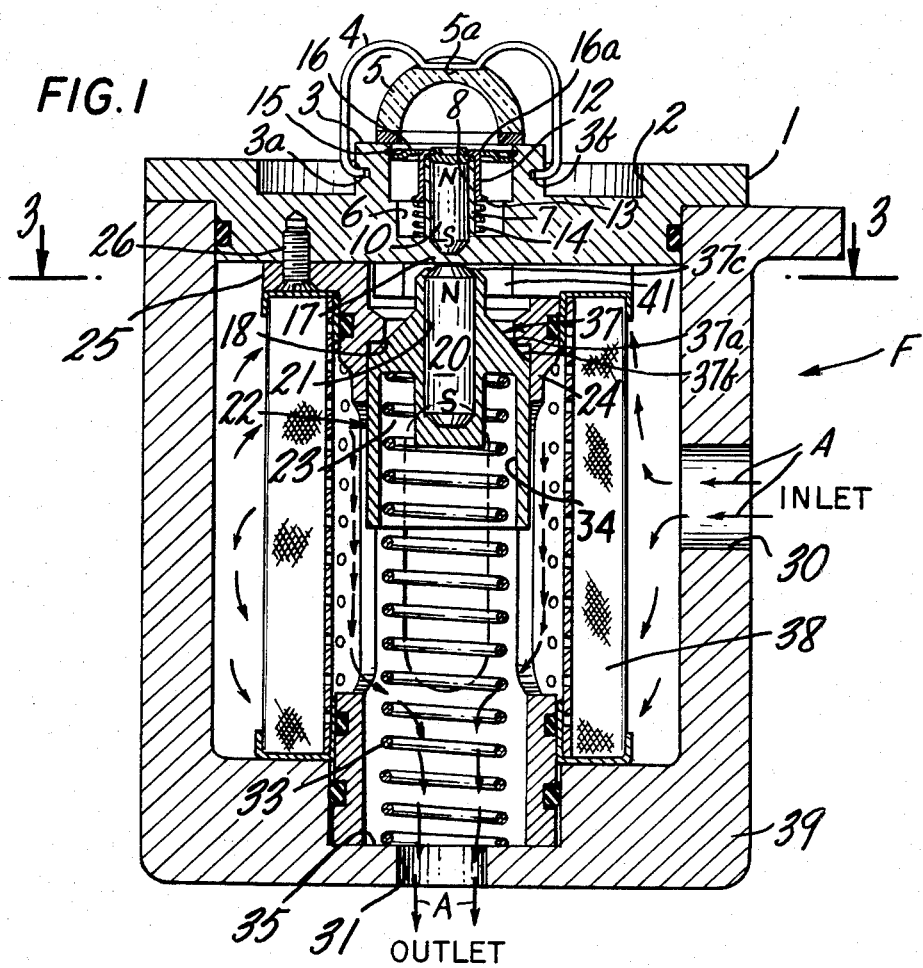
FIG. 1 is a view in longitudinal section taken through a magnetic differential pressure valve according to the invention with the valve in the closed, nonindicating position.
Figure 3:
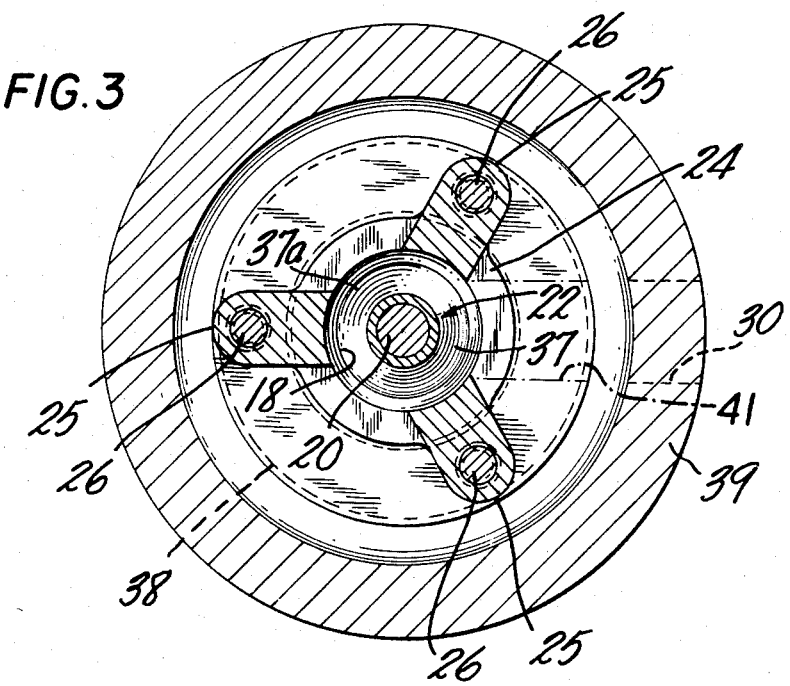
FIG. 3 is a sectional view, taken along the line 3—3 of FIG. 1, and looking in the direction of the arrows.

FIG. 4 is a view in longitudinal section of another embodiment of magnetic differential pressure valve according to the invention, the valve being normally open, and the indicator indicating when the valve has closed; and FIG. 5 is a view in longitudinal section of the magnetic differential pressure valve of FIGS. 1 to 3 arranged to actuate an electric switch when the valve moves to the open position.

The magnetic differential pressure indicating valve shown in FIGS. 1 to 3 has a flanged indicator housing 1 adapted to fit in a niche or socket in a filter assembly or filter unit F. Normal flow through the filter follows path A, shown in FIG. 1. The magnetic differential pressure valve is interposed across and controls fluid flow in a bypass path B, shown in FIG. 2. The bypass path in this case bypasses a filter element 38 which has a tendency to become clogged, and therefore obstruct the flow of fluid, to the extent that bypass of the filter element is required to prevent starvation of the system downstream of the filter element, but the magnetic differential pressure valve can be used to control flow bypassing any type of function that incurs a similar disability in use.

One face of the housing has an annular recess 2 with a central raised boss 3, whose top projects beyond the adjacent surface of the housing. Bores 3a,3b carry a pivotable wire clip 4, which bears against a recess 5a in the surface of a transparent cover 5, and retains the cover snugly against the housing, across the open end of the annular recess 6 within the boss 3. The transparent cover and retaining mechanism are not essential to the function of the device, are optional, and can be omitted.

The central hub 7 in the center of the recess 6 has a cylindrical bore 8 within which reciprocates a magnetic piston 10. The piston carries a cap 12, colored in an eye catching color such as red, and with a flange 13 capturing and confining a compression spring 14 between it and the base of the recess 6. An indicator guide 16 and retainer 15 extend across the open end of the recess 6, below the top of the cap 12 with a central aperture 16a therethrough. The indicating cap and piston reciprocate in the aperture towards and away from the base of the recess, and are prevented from escaping from the central aperture 16a by engagement of the flange 13 with the indicator guide 16 at the aperture.

The compression spring 14 tends to drive the cap and piston outwardly, through the indicator guide 16. The normal position of the cap and piston is however at the inner end of the central aperture 16a with the end of the piston against the wall 17. The piston 10 with magnetic poles N,S as shown is held there by the force of magnetic attraction of a second magnet 20 with its poles oriented in like manner.

The magnet 20 is retained in a central cylindrical bore 21 of a cylindrical differential pressure valve 22, which is in the form of a piston that reciprocates in the cylindrical valve chamber 23 of the valve housing 24. The valve housing has a flange 25, and is attached at the flange to the indicator housing 1 by a number of screws 26, in this case three.

The valve 22 is a kind of poppet valve, with a conical sealing surface 37 at one end, and reciprocates towards and away from sealing leak-tight contact at surface 37 with the valve seat 18 and in the closed position, the end 37c of the valve maintains close proximity with the wall 17 of the indicator housing 1. The closed and open positions of the valve are shown in FIGS. 1 and 2 respectively. In the closed position, seen in FIG. 1, the valve closes the bypass passage 41 cutting off bypass flow along path B, and compelling all flow to follow path A through the filter element 38 in proceeding to the filter outlet. In the open position seen in FIG. 2, the valve 22 allows flow through the bypass passage 41 along path B, past the valve 22, past the now open seat areas 37a and 37b, to the downstream ducts 31 and finally through the filter outlet, bypassing filter element 38. Duct 30 is upstream and duct 31 downstream of the filter element 38 and the valve 22. The valve normally is held in the closed position shown in FIG. 1 by the compression spring 33, which is captured between an annular recess 34 of the valve 22 and the base 35 of the filter bowl 39.

The valve chamber 23 of the valve housing 24 has a valve seat 18 near the end of the chamber, narrowing the diameter of the chamber considerably, at that point. The valve 22 has a conical tip end, constituting the pressure-receiving surface 37, which is separated into two zones, 37a, 37b, by the valve seat 18, when the valve 22 is in the closed position shown in FIG. 1, at which time the valve seat 18 is in sealing leak-tight contact with the pressure surface 37. As a result, in the closed position, the pressure surface exposed to differential fluid pressure between the fluid ducts 30, 31 is limited to the zones 37a and 37c, which is a projected area of diameter 18.

Fluid pressure on forward flow through the function, in this case filter element 38, is normally higher on the upstream side than on the downstream side, so that fluid pressure in the duct 30 gives rise to a pressure differential against the pressure surface 37 in zones 37a and 37c tending to move the valve 22 away from the valve seat 18, which is opposed by the biasing force of the spring 33. Whenever the differential pressure across the valve 22 exceeds the biasing force of the spring, however, the valve 22 is moved away from its closed position shown in FIG. 1, creating a crack opening or gap between the valve and the valve seat. At the same time as the pressure surface 37 of the valve 22 moves away from the valve seat 18 of the valve chamber, it exposes another portion 37b of the pressure surface, considerably increasing the surface area on the valve exposed to differential pressure, and increasing the rate of movement of the valve away from the valve seat 18. As the valve quickly spaces itself at a distance from the wall in which the force of magnetic attraction between the two magnetic elements 10, 20 is now diminished sufficiently, the biasing force of the spring 14 exceeds the magnetic force, and thus propels the indicating piston 10 into the indicating position. This occurs before the valve has opened sufficiently that fluid flow through the bypass passage 41 along path B takes place. Accordingly, after the piston signals that the valve 22 is opening, the ducts 30, 31 come into communication, and the bypass passage 41 (path B) is open to flow.

The valve 22 remains in the open position seen in FIG. 2 while the differential pressure applied to the diameter 18 and surface 37b exceeds the biasing force of spring 33. Whenever the differential pressure is reduced to the point that the biasing force of the spring 33 is the greater, the valve 22 will once again be returned to the closed position by the spring, and bypass flow will cease via path B, while normal flow along path A can resume, if possible. Thus, the valve is automatically opened and closed in accordance with differential pressure arising from forward flow across the filter element 38 and the valve 22.

However, the return of the valve 22 to the closed position will not restore the indicating piston 10 to the nonindicating position, if that piston is in a position beyond the force of magnetic attraction between the two magnetic pistons 10,20, because of the force of the spring 14. Consequently, the indicator continues to indicate that the bypass line has been opened, indicating that servicing of the function such as a clogged filter element must proceed.

If desired, however, the indicating piston 10 can be made to return automatically to its normal position, upon return of the valve 22 to a closed position. In this case, it is only necessary to ensure that with the magnetic piston 20 in close proximity to wall 17 the magnetic piston 10 while in the indicating position is within the field of magnetic attraction of the magnetic piston 20, and the force of magnetic attraction with piston 20 in that position exceeds the biasing force of the spring 14. Then, when the valve 22 reaches the closed position, the indicating piston 10 will once again be attracted into the nonindicating position shown in FIG. 1.

The magnetic differential pressure indicating valve shown in FIG. 4 is normally open, and provides an indication only when the valve has closed. In other respects, the valve is similar to that shown in FIGS. 1 to 3, and therefore like numbers are used for like parts. The flanged indicator housing 1 adapted to fit in a niche or socket in a function such as a filter assembly with the valve interposed across the line of normal fluid flow in a path A, sensing reduced flow when the filter element 38 has become clogged to the extent that the indicating piston 10 moves to the indicating position.

The central hub 7 in the center of the recess 6 of the housing 1 has a cylindrical bore 8 within which reciprocates a magnetic piston 10. The piston carries a cap 12, colored in an eye catching color such as red, and with a flange 13 capturing and confining a compression spring 14 between it and the base of the recess 6. An indicator guide 16 and retainer 15 extend across the open end of the recess 6, below the top of the cap 12 with a central aperture 16a therethrough. The indicating cap and piston reciprocate in the aperture towards and away from the base of the recess, and are prevented from escaping from the central aperture 16a by engagement of the flange 13 with the indicator guide 16 at the aperture.

The compression spring 14 tends to drive the cap and piston outwardly, through the indicator guide 16. The normal position of the cap and piston is however at the inner end of the central aperture 16a with the end of the piston against the wall 17. The piston 10 with magnetic poles N,S as shown is held there by the force of magnetic attraction of a second magnet 20 with its poles oriented in like manner. The magnet 20 is retained in a central cylindrical bore 21 of a cylindrical differential pressure valve 50, which reciprocates in the cylindrical valve chamber 53 of the valve housing 54. The valve housing 54 has a flange 65, and is attached at the flange to the indicator housing 1 by a number of screws 66, in this case three.

The valve 50 is a kind of poppet valve, and reciprocates towards and away from sealing leak-tight contact with the valve seat 51 at the tip of a projection 52 of the valve housing 54. The open position of the valve is shown in FIG. 4. In the closed position, the valve 50 is in contact with the valve seat 51, and closes off flow through the passage 55. Ducts 60, 61 are upstream and downstream, respectively of the function such as the filter element 38. The valve normally is held in the open position shown in FIG. 4 while fluid flow continues through passage 55, but when flow stops the compression spring 56 drives the valve 50 into the closed position, against seat 51. While flow is stopped, the valve is held in the closed position by the compression spring 56, which is captured between an annular recess 57 of the valve 50 and the wall 58 of the indicator housing 1, at the end of chamber 53.

The valve chamber 53 of the valve housing 54 has a projection 52 near the end of the chamber, defining a valve seat 51. The valve 50 has a conical tip end, constituting a pressure-receiving surface 59, separated into two zones, 59a,59b, by the projection 52 when the valve 50 is in the closed position in which the tip 51 of projection 52 is in sealing leak-tight contact with the pressure surface 59. As a result, when the valve is closed the pressure surface exposed to differential fluid pressure between the fluid ducts 60, 61 is limited to the zone 59a, which is a projected area of diameter 51 while when the valve 50 is open the entire surface 59 is exposed to fluid pressure in chamber 53.

The fluid pressure on forward flow through the function is normally higher than the biasing force of spring 56, so that fluid pressure against the pressure surface tends to hold the valve 50 away from the valve seat 51, but this is opposed by the biasing force of the spring 56. Whenever pressure upon the valve surface 59 is less than the biasing force of the spring, however, such as when flow stops, the valve 50 is moved into its closed position by the spring. At the same time, the valve 50 quickly spaces itself and piston 20 at a distance from the wall in which the force of magnetic attraction between the two magnetic elements 10,20 is now diminished sufficiently that the biasing force of the spring 14 propelling the magnetic piston 10 into the indicating position exceeds the magnetic force, and thus pops the indicating piston 10 into position. Accordingly, the piston now signals that the valve 50 has closed, and that the ducts 60, 61 are no longer in communication.

The valve 50 remains in the closed position while the differential pressure applied to the diameter 51 and surface 59a,59b is exceeded by the biasing force of spring 56. Whenever the differential pressure is increased to the point that the biasing force of the spring 56 is overcome, the valve 50 will once again be returned to the open position, and flow will begin again. Thus, the valve is automatically opened and closed in accordance with differential pressure arising from forward flow across the function and the valve 50.

However, the return of the valve 50 to the open position will not restore the indicating piston 10 to the nonindicating position, if that piston is in a position beyond the force of magnetic attraction between the two magnetic pistons 10,20, because of the force of the spring 14. Consequently, the indicator continues to indicate that the line has been closed.

If desired, however, the indicating piston 10 can be made to return automatically to its normal position, upon return of the valve 50 to an open position. In this case, it is only necessary to ensure that with the magnetic piston 20 in close proximity to wall 17, in the indicating position the magnetic piston 10 is within the field of magnetic attraction of the magnetic piston 20, and the force of magnetic attraction with piston 20 in that position exceeds the biasing force of the spring 14. Then, when the valve 22 reaches the closed position, the indicating piston 10 will once again be attracted into the nonindicating position shown in FIG. 1.

In the embodiment shown in FIG. 5, the indicating magnet 76 of the differential pressure indicator of FIGS. 1 to 3 is adapted to provide an electric signal to warn of a clogged filter element. To this end, a switch 70 is mounted in a sleeve 71 affixed to the housing 73. Also mounted in the sleeve a lever 74 is pivotally supported with one end 75 extending above the indicating magnet 76. Positioned above the end 75 a switch actuator 78 is movable by the arm to actuate the switch 70 when the indicating magnet 76 rises into indicating position. In order to restrict the motion of the magnet 76 an end of the switch is mounted to intercept the magnet at shoulder 82. The indicator may be reset manually by operating the reset button 79. To provide a remote indication of actuation of the indicator, suitable conductors 81 from the switch 70 are arranged in any conventional manner to complete appropriate electrical circuits whenever the switch is operated or reset.

In the embodiments shown in the drawings, the magnetic pistons 10,20 are arranged so as to attract each other, with opposed poles. If the valve 22 is to be held normally open, or the valve 50 normally closed, and only closed or opened when differential pressure exceeds a predetermined value, the pistons 10,20 can be arranged so as to be mutually repelling, with like poles facing ech other. This requires only a small modification of the structure shown, that would be obvious to anyone skilled in the art with a knowledge of magnetic principles, using the principles of this invention as discussed above.

For example, in the embodiments shown in FIGS. 1 to 5 the magnetic pistons 10, 20 can be reversed, so that the south pole of piston 10 faces the south pole of magnetic piston 20 and the piston 20 relocated so that it is at the opposite end of the valve chamber, in its normal position, with the springs 33,56 relocated to the opposite side of the piston, to bias the valve in the opposite direction. Now, a pressure differential sensed by the valve surfaces 37a, 37b or 59a, 59b tends to move the valve towards valve seat 18, 51, and as it does so magnetic piston 20 repels magnetic piston 10 away from wall 17, and eventually to an indicating position. In this type of embodiment, pistons 10,20 must both be magnets, unless wall 17 is a magnet of opposite polarity, instead of piston 20.

The terms "react with" and "reaction with" as used in the claims refer to the forces of magnetic attraction or repulsion between the first and second magnetic means. The first magnetic means is spaced from and arranged to attract or repel and the reby react with the second magnetic means, so long as the two means are within the mutually reactive magnetic fields of force. The term "magnetic means" encompasses both magnets and magnetically attracted materials, and it will be understood that a keeper can be interposed therebetween, and that the keeper can be of magnetic or nonmagnetic material.

Having regard to the foregoing disclosure, the following is claimed as inventive and patentable embodiments thereof:

1. A magnetic differential pressure valve having an indicator showing when the valve is moving but before the valve has moved into one of the open and closed positions, comprising a housing including a valve seat; valve means reciprocably mounted in the housing for movement towards and away from the valve seat between open and closed positions; providing a neutral zone in which during valve movement therethrough the valve has moved away from the closed or open position but has not reached the open or closed position, respectively; first magnetic means reciprocably movable with the valve means toward and away from the valve seat; first bias means urging the valve means the first magnetic means to move in one direction and normally retaining the valve means and first magnetic means in one of the closed and open positions; first fluid duct means communicating with a source of fluid under pressure and with first and second pressure-receiving surfaces on the valve means to urge it and the first magnetic means in the opposite direction; second fluid duct means communicating with the first fluid duct mens for fluid flow past the valve means only when the valve means has moved a sufficient distance away from the valve seat to be beyond the neutral zone second magnetic means movable toward and away from the first magnetic means and normally retained in a first nonindicating position, reacting with the first magnetic means whenever the two means are spaced a sufficient distance apart to be within their mutually reactive magnetic fields of force, said distance being less than the distance the valve must move to reach one of the closed and open positions; and corresponding to the neutral zone; and second bias means urging the second magnetic means into one of the nonindicating and indicating positions when the first magnetic means has moved to a predetermined distance from the second magnetic means within the neutral zone that is less than the distance at which the valve has moved into one of the open and closed positions, the second magnetic means thereby moving into its nonindicating or indicating position before the valve means has moved into the other of its closed and open positions, and in that position indicating that the valve means is either opening or closing fluid flow communication between the first and second fluid duct means, the first fluid duct means communicating fluid pressure only to the first pressure-receiving surface with the valve in one of the closed and opened positions to urge the valve away from said closed or open positions towards one of the open and closed positions respectively; the second pressure-receiving surface on the valve being exposed to fluid pressure via the first fluid duct means only after the valve has moved away from the closed or open position but while the valve is still in the neutral zone before the valve has moved into one of the open and closed positions; thereby to increase the rate of travel of the valve and ensure movement of the second magnetic means by the second bias means into one of the nonindicating and indicating positions before the valve has moved out from the neutral zone into one of the open and closed positions.

2. A magnetic differential pressure valve according to claim 1, in which the valve means is in the form of a piston, moving in a bore in the housing.

3. A magnetic differential pressure valve according to claim 1, in which the valve means is a piston having a surface area of limited exposure while the valve means is in the closed position, and of full exposure when the valve means has moved away from the closed position.

4. A magnetic differential pressure valve according to claim 1, in which at least one of the first and second bias means is a spring.

5. A magnetic differential pressure valve according to claim 1, in which the second magnetic means is propelled into an indicating position before the valve means moves from a closed to an open position.

6. A magnetic differential pressure valve according to claim 1, in which the second magnetic means is propelled into an indicating position before the valve means moves from an open to a closed position.

7. A magnetic differential pressure valve according to claim 1, having a wall between the valve means and the second magnetic means.

8. A magnetic differential pressure valve according to claim 1, in which the second magnetic means is arranged so as to become visible after actuation.

9. A magnetic differential pressure valve according to claim 1, in which the second magnetic means is arranged so as to actuate a switch.

10. A magnetic differential pressure valve according to claim 1, in which both the first and second magnetic means are magnets.

11. A magnetic differential pressure valve according to claim 1, in which one of the first and second magnetic means is a magnet, and one is of magnetizable material.

12. A magnetic differential pressure valve according to claim 1, in which the first and second magnetic means are separated by a wall, both of the magnetic means are of magnetizable material, and the wall is a magnet.

13. A magnetic differential pressure valve according to claim 1, in which one of the first and second magnetic means is a magnet and the wall is a magnet.

14. A magnetic differential pressure valve according to claim 1, in which the first and second magnetic means are mutually attracting.

15. A magnetic differential pressure valve according to claim 1, in which the first and second magnetic means are mutually repelling.

* * * * *